J. B. Wortendyke.
Paper Twine Mach.
No. 1,817. Reissued Nov. 8, 1864.
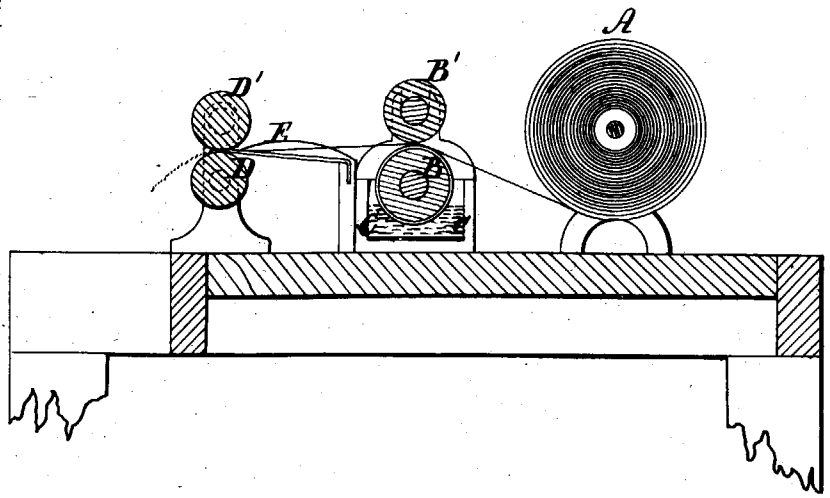
Witnesses;
Henry T. Brown
J. F. Coombs
Inventor;
J. B. Wortendyke

UNITED STATES PATENT OFFICE.

JOHN B. WORTENDYKE, OF GODWINVILLE, NEW JERSEY.

IMPROVEMENT IN MACHINES FOR MAKING PAPER TWINE, &c.

Specification forming part of Letters Patent No. 42,896, dated May 24, 1864; Reissue No. 1,817, dated November 8, 1864.

DIVISION A.

*To all whom it may concern:*

Be it known that I, JOHN B. WORTENDYKE, of Godwinville, in the county of Bergen and State of New Jersey, have invented a new and useful Improvement in the Manufacture of Paper Twine or Cord; and I hereby declare the following is a full, clear, and exact description of the same.

This invention relates to the manufacture of paper twine or cord by twisting a strip or strips of paper into the requisite form; and it consists in performing the twisting operation while the paper is in a moistened condition, in which condition it is enabled to be twisted more uniformly and compactly and to better retain the twist.

There are various ways in which the moistening of the paper may be performed, but to enable others to apply my invention to use, I will describe, with reference to the accompanying drawings, forming part of this specification, the manner in which I have successfully practiced it in the manufacture of paper twine for the market.

The drawing is a vertical section.

The paper cut in a strip of suitable width, and of as great length as possible, is wound up on a roll, A, the axle of which is mounted in suitable bearings to enable it to turn freely, and from this roll it is conducted in a flat state between a pair of pressure-rollers, B B′, thence through a taper spout-like guide, E, to and between a second pair of pressure-rolls, D D′, from which it passes to a spindle or throstle, substantially like what is used in the spinning of cotton and other fibrous substances. The rollers have imparted to them a rotary motion, by which the paper is drawn off from the roll A and through the taper guide E. The lower roll, B, has its periphery dipping into a trough or box, C, containing water, and its periphery is grooved, that it may take up water and apply it to the paper. The paper, being thus moistened, is enabled to be easily gathered up laterally in the form of roping, by its passage through the taper guide E, and in this condition it is taken by the front rolls, D D′, to be conveyed to the spindle, throstle, or other twisting device, which operates upon it while it is still in a moist condition.

The paper is represented in yellow color.

I do not confine myself to any method of moistening the paper; but

I claim as an improvement in the manufacture of paper twine or cord and desire to secure by Letters Patent—

Performing the twisting operation while the paper is in a moistened state, substantially as and for the purpose herein set forth.

J. B. WORTENDYKE.

Witnesses:

HENRY T. BROWN,

J. W. COOMBS.